(12) United States Patent
Shikama

(10) Patent No.: US 12,691,507 B2
(45) Date of Patent: Jul. 28, 2026

(54) DRILL BODY AND MANUFACTURING METHOD OF DRILL BODY

(71) Applicant: TUNGALOY CORPORATION, Fukushima (JP)

(72) Inventor: Hiroya Shikama, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 539 days.

(21) Appl. No.: 18/306,733

(22) Filed: Apr. 25, 2023

(65) Prior Publication Data

US 2023/0398612 A1 Dec. 14, 2023

(30) Foreign Application Priority Data

Jun. 9, 2022 (JP) ................................. 2022-093597

(51) Int. Cl.
*B23B 51/06* (2006.01)
*B23B 51/00* (2006.01)
*B23P 15/32* (2006.01)

(52) U.S. Cl.
CPC ........ B23B 51/0686 (2022.01); B23B 51/068 (2022.01); *B23B 51/0005* (2022.01); *B23B 2222/84* (2013.01); *B23P 15/32* (2013.01)

(58) Field of Classification Search
CPC .......... B23B 51/0003; B23B 51/00035; B23B 51/0004; B23B 51/0005; B23B 51/06; B23B 51/068; B23B 51/0686; B23B 2224/84

See application file for complete search history.

(56) References Cited

U.S. PATENT DOCUMENTS

| | | | | |
|---|---|---|---|---|
| 6,447,222 | B2 * | 9/2002 | Kojima | B23B 51/02 408/230 |
| 7,168,893 | B2 * | 1/2007 | Takiguchi | B23B 51/00035 408/233 |
| 7,241,085 | B2 * | 7/2007 | Frisendahl | B23B 51/02 408/230 |
| 8,388,279 | B2 * | 3/2013 | Kitsukawa | B23B 51/06 408/58 |

(Continued)

FOREIGN PATENT DOCUMENTS

| | | | |
|---|---|---|---|
| DE | 10 2014 208 134 A1 | 11/2015 | |
| EP | 2319645 A1 * | 5/2011 | B23C 5/22 |

(Continued)

*Primary Examiner* — Eric A. Gates

(74) *Attorney, Agent, or Firm* — Studebaker Brackett PLLC

(57) ABSTRACT

A drill body supplies a cutting fluid while securing stiffness of a leading end part. A body extends from a base end toward a leading end; a discharge groove to discharge chips; a fluid hole having a part which passes through an inside, of the body, of an inter-groove solid part of the discharge groove and causes a fluid to flow from the base end toward the leading end; and a mounting part in the leading end for mounting a cutting edge. The mounting part has a recessed part along the central axis of the body, and a cross section of the fluid hole changes from a circular shape to a non-circular shape midway along a path of the fluid hole from the base end toward the leading end, and assumes another non-circular shape in a portion which passes a side part of the recessed part.

6 Claims, 8 Drawing Sheets

LEADING END SIDE

BASE END SIDE

A-A CROSS SECTION

(56)                    References Cited

U.S. PATENT DOCUMENTS

| | | | |
|---|---|---|---|
| 9,248,512 B2 * | 2/2016 | Aare | ..................... B23B 51/02 |
| 2006/0006576 A1 | 1/2006 | Karos | |
| 2015/0321267 A1 | 11/2015 | Takai | |
| 2020/0406379 A1 | 12/2020 | Aso | |
| 2021/0316376 A1 | 10/2021 | Filho et al. | |
| 2021/0323080 A1 | 10/2021 | McKinley et al. | |
| 2022/0355392 A1 * | 11/2022 | Osawa | ................ B23B 51/068 |
| 2023/0182212 A1 * | 6/2023 | Zettler | ................. B33Y 80/00 |
| | | | 407/110 |
| 2023/0398611 A1 * | 12/2023 | Shikama | .............. B23B 51/068 |

FOREIGN PATENT DOCUMENTS

| | | | | |
|---|---|---|---|---|
| JP | 5926877 B2 | 5/2016 | | |
| JP | 6769530 B1 | 10/2020 | | |
| KR | 200447595 Y1 * | 2/2010 | ............ | B23B 51/02 |
| KR | 20110005616 U * | 6/2011 | ....... | B23B 51/00035 |
| WO | WO-2010105608 A1 * | 9/2010 | ............ | B23B 51/02 |
| WO | 2018/021580 A1 | 2/2018 | | |

* cited by examiner

CUTTING FLUID

BASE END SIDE

LEADING END SIDE

A-A CROSS SECTION

B-B CROSS SECTION

C-C CROSS SECTION

DRILL BODY AND MANUFACTURING METHOD OF DRILL BODY

BACKGROUND OF THE INVENTION

Field of the Invention

The present invention relates to a drill body and a manufacturing method of a drill body.

Description of the Related Art

A technique for supplying a cutting region with a cutting fluid via a flow hole provided inside a drill body is known. In such a drill, in order to secure stiffness of the drill, measures such as making a cross sectional shape of the flow hole a fan shape in accordance with a shape of a chip discharge groove are becoming well known (for example, refer to Japanese Patent No. 5926877).

There are drills to be used by mounting a removable cutting edge member to a leading end part of a drill body. When mounting a cutting edge member to the leading end part, the cutting region is to exist even further in front of the leading end part of the drill body. Therefore, when providing a flow hole for a cutting fluid inside the drill body, it is difficult to supply the cutting region with the cutting fluid in a suitable manner. In particular, the leading end part of the drill body is provided with a mounting part for mounting the cutting edge member, and stiffness of the leading end part must also be secured even when such a mounting part is provided.

The present invention has been made in order to solve such problems and provides a drill body which includes a flow hole capable of appropriately supplying a cutting region with a cutting fluid while securing stiffness of a leading end part and a manufacturing method of the drill body.

SUMMARY OF THE INVENTION

A drill body according to a first aspect of the present invention includes: a body part which extends in a rod shape from a base end part toward a leading end part; a discharge groove which is provided around a central axis of the body part in order to discharge chips; a fluid hole which is provided such that at least a part thereof passes through an inside, of the body part, of an inter-groove solid part of the discharge groove and which causes a fluid to flow from a side of the base end part toward a side of the leading end part; and a mounting part which is provided in the leading end part and which is for mounting a removable cutting edge member, wherein the mounting part has a recessed part which is provided along the central axis of the body part from an end surface of the leading end part, and a hole cross section of the fluid hole changes from a circular shape to a non-circular shape which is longer in a circumferential direction than in a radial direction in an axial cross section of the body part midway along a path of the fluid hole from the base end part toward the leading end part and assumes a non-circular shape in a portion which passes a side part of the recessed part.

In addition, a manufacturing method of a drill body according to a second aspect of the present invention is a manufacturing method of a drill body including: a body part which extends in a rod shape from a base end part toward a leading end part; a discharge groove which is provided around a central axis of the body part in order to discharge chips; a fluid hole which is provided such that at least a part thereof passes through an inside, of the body part, of an inter-groove solid part of the discharge groove and which causes a fluid to flow from a side of the base end part toward a side of the leading end part; and a mounting part which is provided in the leading end part and which is for mounting a removable cutting edge member, wherein the manufacturing method of a drill body involves laminating, solidifying, and forming a steel material along the central axis of the body part so that the mounting part has a recessed part which is provided along the central axis from an end surface of the leading end part, and a hole cross section of the fluid hole changes from a circular shape to a non-circular shape which is longer in a circumferential direction than in a radial direction in an axial cross section of the body part midway along a path of the fluid hole from the base end part toward the leading end part and assumes a non-circular shape in a portion which passes a side part of the recessed part.

According to the present invention, a drill body which includes a flow hole capable of appropriately supplying a cutting region with a cutting fluid while securing stiffness of a leading end part and a manufacturing method of the drill body can be provided.

DETAILED DESCRIPTION OF THE PREFERRED EMBODIMENT

An embodiment of the present invention will be described with reference to the accompanying drawings. Note that elements given the same reference signs in the respective drawings have same or similar configurations. In addition, when there are a plurality of structures with the same or similar configurations in the respective drawings, some structures may be given reference signs while the same reference signs may be omitted with respect to other structures in order to avoid complexity. Furthermore, not all components described in the embodiment are essential as solutions to the problem.

Figure 1:
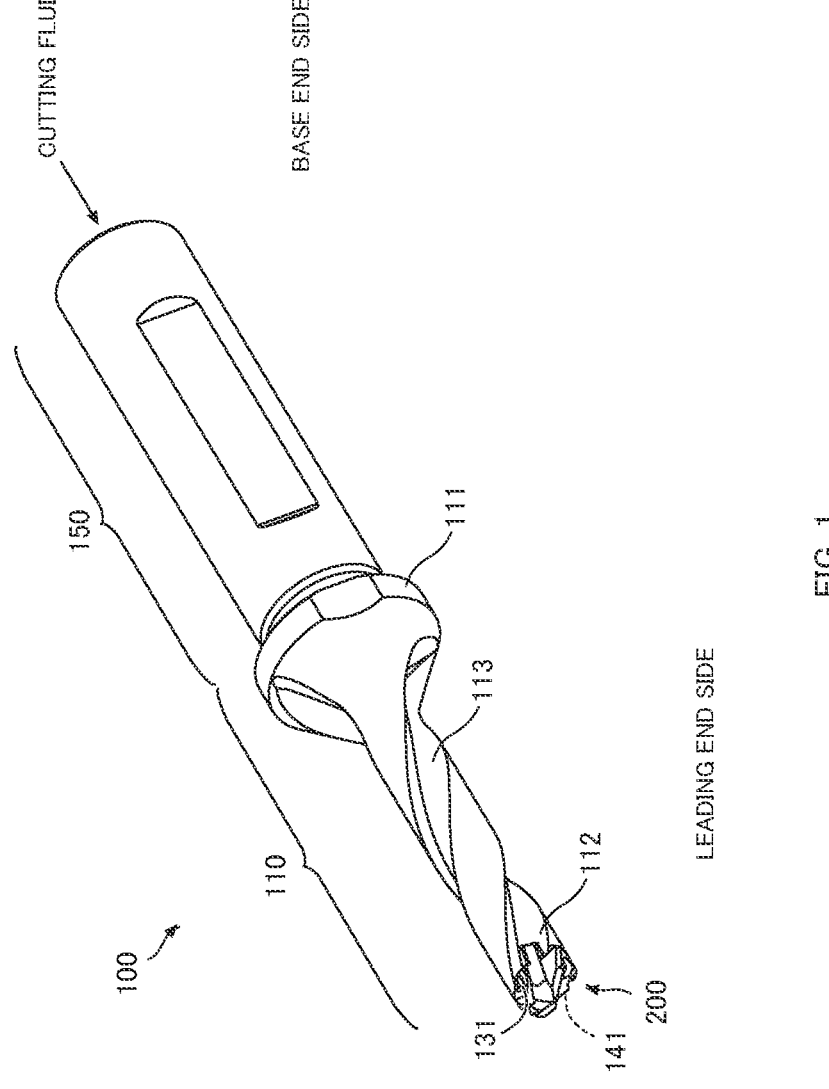
FIG. 1 is an overall perspective view of a drill according to a present embodiment.

FIG. 1 is an overall perspective view of a drill 10 according to a present embodiment. The drill 10 is an indexable cutting edge drill configured by having a removable cutting edge member 200 being mounted to a leading end of a drill body 100. For example, the cutting edge member 200 which cuts work is formed of cemented carbide and the drill body is formed by steel, not cemented carbide. By making the cutting edge member 200, which is susceptible to abrasion and damage, indexable, both hardness required by an edge and an operation cost of an entire drill can be satisfied.

The drill body 100 is constituted of a body part 110 in which a discharge groove 113 is provided in a spiral shape and a shank part 150 which is a portion of a handle fixed to a machine tool such as a drilling machine, the body part 110 and the shank part 150 being linearly continuous. Note that, in the present embodiment, when the drill 10 is fixed to a machine tool, a fixed side will be referred to as a base end side and a side opposing the work will be referred to as a leading end side.

The body part 110 extends in a rod shape from a base end part 111 which is continuous with the shank part 150 toward a leading end part 112 to which the cutting edge member 200 is to be mounted. While the base end part 111 which connects to the shank part 150 has a diameter which expands in a flange shape in the body part 110 according to the present embodiment, a cylindrical shape with a same diameter may be formed from the base end part 111 to the leading end part 112.

The discharge groove 113 is a groove which is provided in a spiral shape around a central axis of the body part 110 and which is for discharging chips of the work and, in the present embodiment, two discharge grooves 113 are arranged. For example, chips cut from the work ascend in the body part 110 along the discharge groove 113 and are discharged in an outer circumference direction of the drill 10 by the base end part 111 which protrudes in a flange shape. In other words, the base end part 111 which protrudes in a flange shape has a role of preventing chips from colliding with or adhering to a side of the machine tool which supports the shank part 150. Accordingly, for example, it is expected that mounting accuracy of the drill 10 can be improved by preventing chips from getting caught when fixing the shank part 150 and, furthermore, machining accuracy of the work can be improved.

Although details will be provided later, a flow hole which causes a cutting fluid supplied from the base end side of the shank part 150 to flow and which causes the cutting fluid to be discharged from discharge ports 131 and 141 provided in the leading end part 112 of the body part 110 is formed inside the drill body 100. The cutting fluid is a medium referred to as a coolant which is supplied in order to remove heat generated in the cutting region and reduce a force of friction between the edge and the work. While the use of a fluid such as an emulsion being a mixture of water and oil or the use of a cutting oil is assumed in the present embodiment, a gas such as compressed air can also be used in place of the coolant.

Figure 2:
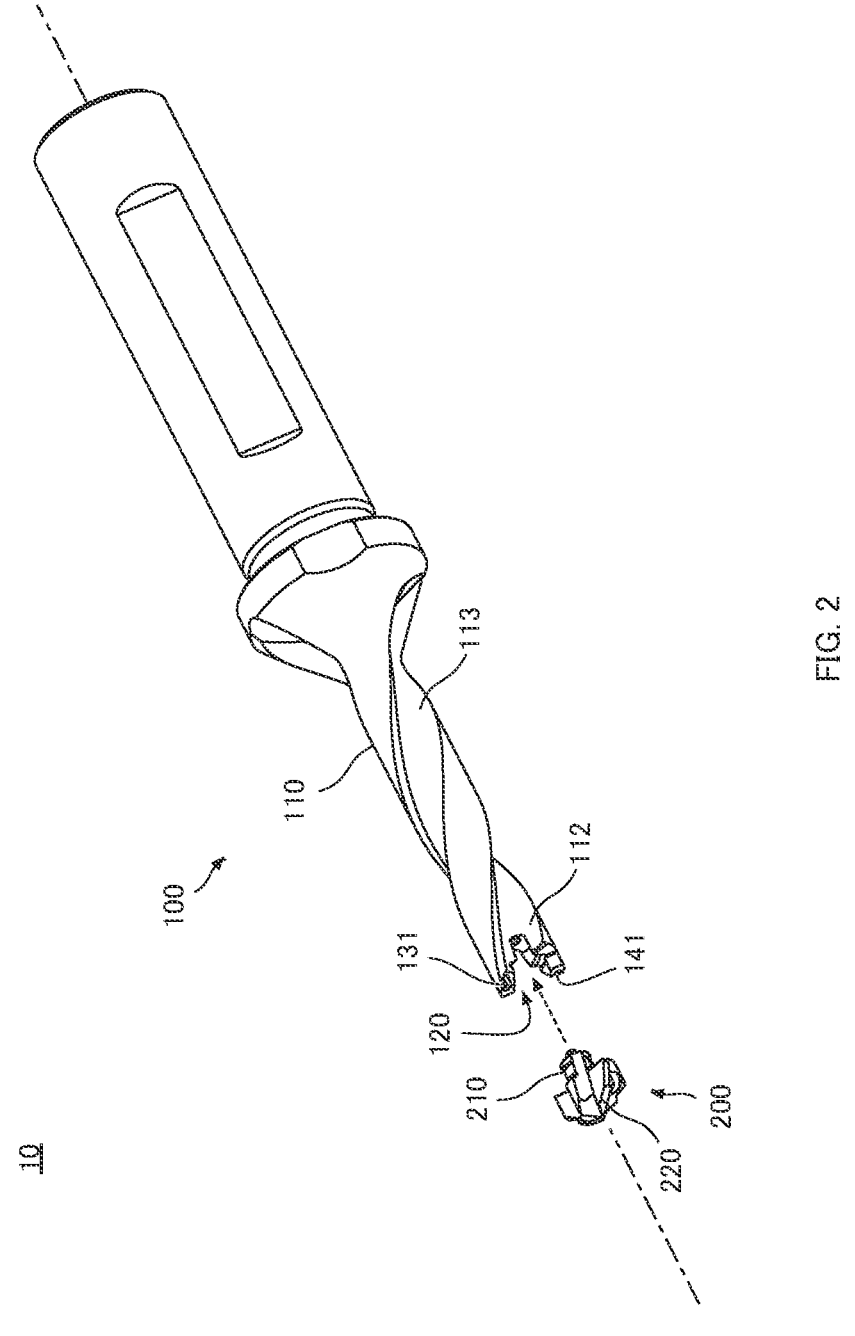
FIG. 2 is a perspective view showing a cutting edge member being mounted to a drill body.

FIG. 2 is a perspective view showing the cutting edge member 200 being mounted to the drill body 100. The drill body 100 includes, in the leading end part 112, a mounting recessed part 120 which is a mounting part for mounting the cutting edge member 200. Specifically, the mounting recessed part 120 has a recessed shape provided along a central axis P of the body part 110 from an end surface of the leading end part 112. In the present embodiment, since the discharge groove 113 is provided from the leading end part 112, a peripheral part of the recessed shape is shaped such that a portion which does not substantially overlap with the discharge groove 113 protrudes toward a leading end side. Although a specific description will be provided later, the discharge ports 131 and 141 are provided in the protruding shape portion.

The cutting edge member 200 includes a mounting projected part 210 which is a mounting part for mounting the cutting edge member 200 to the mounting recessed part 120 of the drill body 100. Specifically, the mounting projected part 210 has an approximately cylindrical shape which can be fitted into the mounting recessed part 120. In addition, the cutting edge member 200 includes a plurality of cutting edges 220 which are radially provided on a side opposing the work which is on an opposite side to the mounting projected part 210. A worker can fix the cutting edge member 200 to the drill body 100 by fitting the mounting projected part 210 into the mounting recessed part 120 while checking phases of the discharge ports 131 and 141 and the cutting edges 220.

Figure 3:
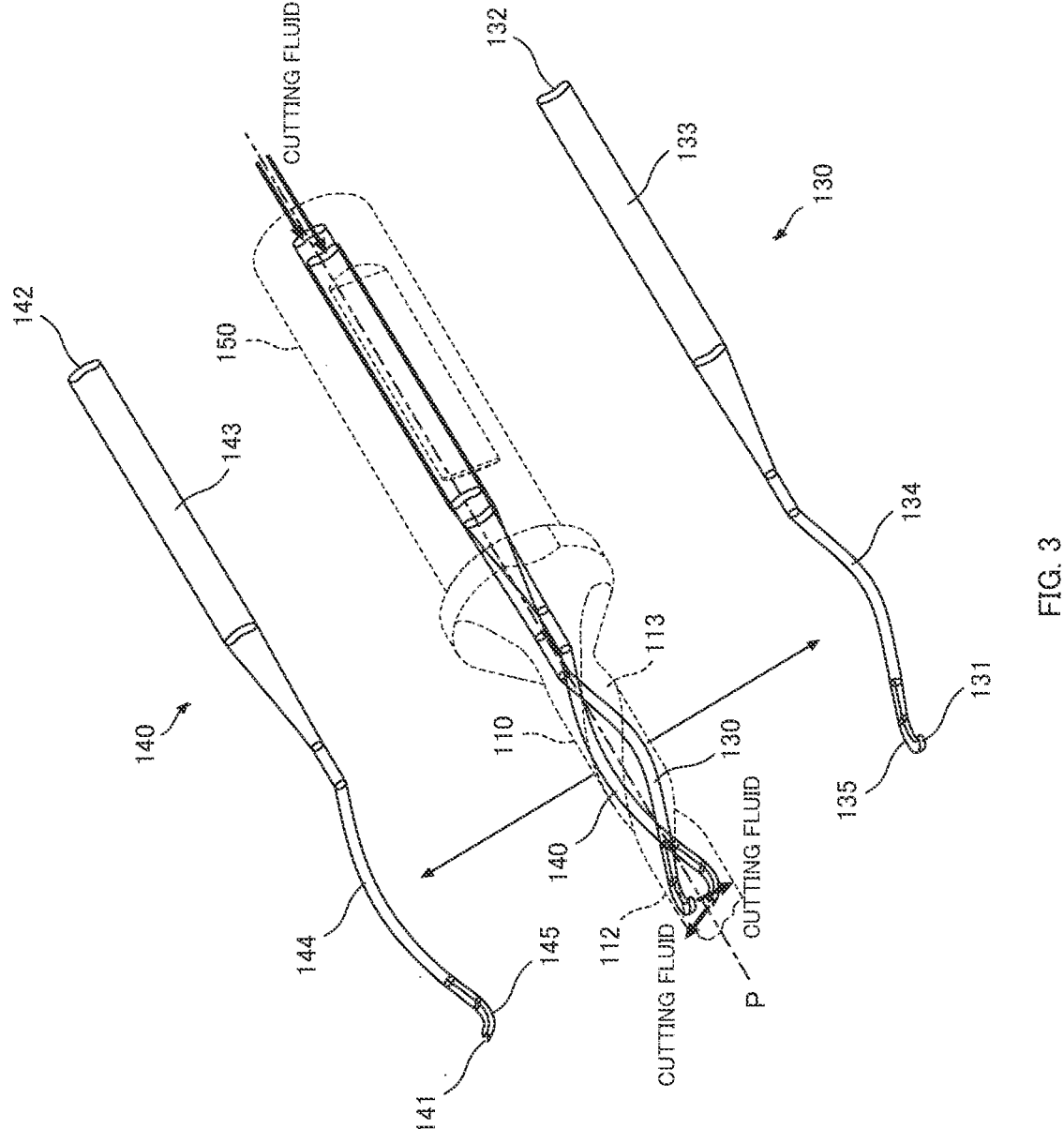
FIG. 3 is a diagram showing a structure of a fluid hole formed inside the drill body.

FIG. 3 is a diagram showing a structure of a fluid hole formed inside the drill body 100. In the present embodiment, two discharge grooves 113 are provided and, in accordance therewith, two fluid holes, namely, a first fluid hole 130 and a second fluid hole 140 are provided. FIG. 3 indicates a rough outline of the drill body 100 by a dotted line, represents the first fluid hole 130 and the second fluid hole 140 provided inside the drill body 100 as a perspective view so that an arrangement of the fluid holes is revealed, and extracts and represents each fluid hole to be separated from each other so that the shape of each fluid hole is revealed.

The first fluid hole 130 guides the cutting fluid supplied from a supply port 132 to the discharge port 131. The first fluid hole 130 includes a straight part 133 which is parallel to the central axis P in a portion positioned inside the shank part 150, a spiral part 134 which is parallel to the discharge groove 113 in most of a portion positioned inside the body part 110, and a bent part 135 in a portion, of the body part 110, positioned inside the leading end part 112. The discharge port 131 is provided immediately after the bent part 135.

The second fluid hole 140 guides the cutting fluid supplied from a supply port 142 to the discharge port 141. The second fluid hole 140 includes a straight part 143 which is parallel to the central axis P in a portion positioned inside the shank part 150, a spiral part 144 which is parallel to the discharge groove 113 in most of a portion positioned inside the body part 110, and a bent part 145 in a portion, of the body part 110, positioned inside the leading end part 112. The discharge port 141 is provided immediately after the bent part 145.

Therefore, the straight part 133 and the straight part 143 are parallel to each other while the spiral part 134 and the spiral part 144 are in a mutually twisted arrangement relationship around the central axis P. In addition, due to the bent part 135 and the bent part 145 being bent in mutually different directions, the cutting fluid is discharged in specific mutually different directions as will be described later.

Figure 4:
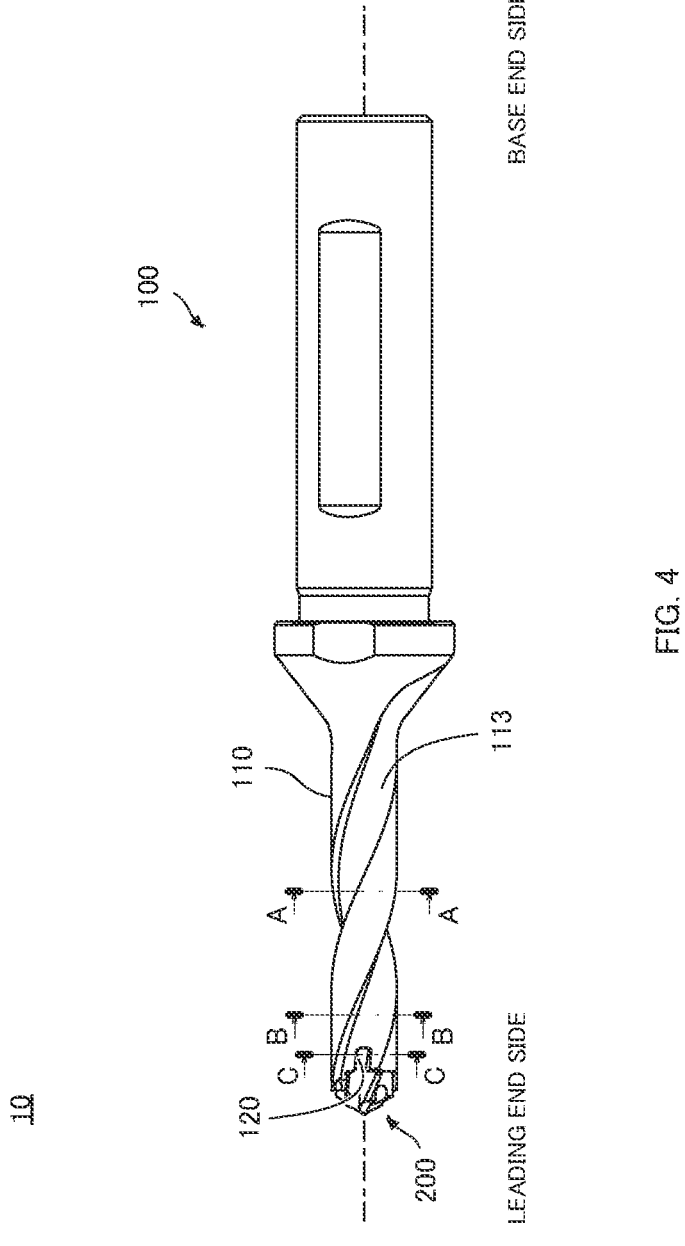
FIG. 4 is a side view of the drill.

FIG. 4 is a side view of the drill 10. As illustrated, an A-A cross section, a C-C cross section, and a B-B cross section of the body part 110 are defined, the A-A cross section being near halfway between the base end side and the leading end side and being perpendicular to the central axis P, the C-C cross section being near a leading end traversing the mounting recessed part 120 and being perpendicular to the central axis P, the B-B cross section being between the A-A cross section and the C-C cross section and being perpendicular to the central axis P.

Figures 5A, 5B, 5C:
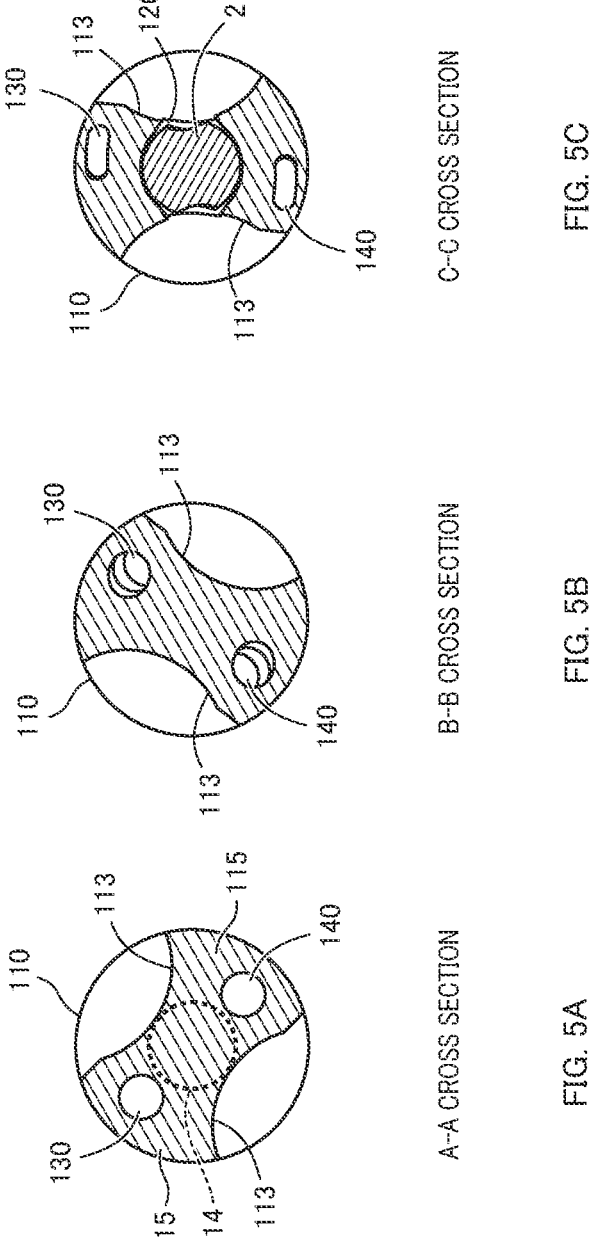
FIGS. 5A-5C are sectional views representing a cross section perpendicular to a central axis.

FIGS. 5A-5C are sectional views by each cross section perpendicular to the central axis P. Specifically, FIG. 5A represents the A-A cross section shown in FIG. 4, FIG. 5B represents the B-B cross section shown in FIG. 4, and FIG. 5C represents the C-C cross section shown in FIG. 4.

As shown in FIG. 5A, in the A-A cross section, a hole cross section of the first fluid hole 130 and a hole cross section of the second fluid hole 140 are both circular shapes. In addition, as described with reference to FIG. 3, near midway in the body part 110 where the A-A cross section is positioned, since the first fluid hole 130 and the second fluid hole 140 are in a mutually twisted relationship around the central axis P, the respective hole cross sections appear at mutually point-symmetric positions with respect to the central axis P. Furthermore, each hole cross section is positioned on an outer circumference side of a central axis part 114 which is sandwiched in a radial direction by the two discharge grooves 113 with respect to a contour circle of the body part 110 in an inter-groove solid part 115 which is an inter-groove part between the discharge grooves 113 with respect to a circumferential direction. In other words, the inter-groove solid part 115 is a solid part between the two discharge grooves 113 provided in a spiral shape around the central axis P and, therefore, two inter-groove solid parts 115 are also formed around the central axis part 114 in a spiral shape.

The first fluid hole 130 and the second fluid hole 140 are each provided so as to pass through an inside of the inter-groove solid part 115. A part of a hole cross section of each of the first fluid hole 130 and the second fluid hole 140 may overlap with the central axis part 114. By providing each of the first fluid hole 130 and the second fluid hole 140 in this manner, both a relatively large area of the hole cross section and high stiffness of the body part 110 can be realized. Note that even when a single discharge groove 113 is provided in a spiral shape in the body part 110, a similar inter-groove solid part 115 is formed between grooves which lead and follow in the direction of the central axis P. In addition, even when three or more discharge grooves 113 are provided in a spiral shape, a similar inter-groove solid part 115 is formed between grooves which are adjacent to each other in the direction of the central axis P. The number and size of the fluid holes may be determined in accordance with a structure of each inter-groove solid part and specifications of the drill 10.

When the first fluid hole 130 and the second fluid hole 140 are formed such that a cross section perpendicular to a flow path direction of each fluid hole assumes a circular shape, in a precise sense, the cross section is a slightly elliptical shape due to the effect of torsion of the flow path with respect to a cross section perpendicular to the central axis P. However, when a general spiral angle of a discharge groove in a drill is taken into consideration, since both a relatively large area of the hole cross section and high stiffness of the body part 110 can be realized even in such a case, the hole cross section can be assumed to have substantially a circular shape.

As shown in FIG. 5B, in the B-B cross section, the hole cross section of the first fluid hole 130 and the hole cross section of the second fluid hole 140 are non-circular shapes which are close to a circular shape. More specifically, the hole cross sections have an oval shape having a shorter length in the radial direction with respect to the contour circle of the body part 110 as compared to a circular shape in the A-A cross section.

As shown in FIG. 5C, in the C-C cross section, the hole cross section of the first fluid hole 130 and the hole cross section of the second fluid hole 140 are both non-circular shapes. More specifically, the hole cross sections have an oval shape which is elongated in the circumferential direction with respect to the contour circle of the body part 110. Note that in the C-C cross section, the mounting recessed part 120 is formed in a region corresponding to the central axis part 114 and, in the drawing, the cross section of the mounting projected part 210 appears.

As shown in FIG. 5A, FIG. 5B, and FIG. 5C, in the body part 110, the hole cross sections of the first fluid hole 130 and the second fluid hole 140 change from a circular shape to a non-circular shape which is longer in the circumferential direction than the radial direction in an axial cross section of the body part 110 midway along a path from the base end part 111 toward the leading end part 112 and assume a non-circular shape in a portion which passes a side part of the mounting recessed part 120. By making the hole cross section a non-circular shape which is longer in the circumferential direction than the radial direction in the axial cross section of the body part 110 in a portion which passes the side part of the mounting recessed part 120, a large hole cross section can be realized while securing high stiffness even when the side part is shaped so as to protrude toward the leading end side. While an oval has been adopted as a non-circular shape in the present embodiment, an ellipse, a fan-like trapezoid, a rectangle, or the like may be adopted instead.

By changing a cross sectional shape of the fluid holes in this manner, even in a configuration in which a mounting part is provided and a cutting edge member is mounted in the leading end part of the drill body, a cutting fluid can be supplied more closely to the cutting region while securing stiffness of the entire drill body including the leading end part. Although the position where a circle changes to a non-circle is preferably on the base end side with respect to a position where a side part of the mounting recessed part 120 is passed as in the present embodiment, the position may be in the side part of the mounting recessed part 120. The position where the circle changes to the non-circle may be determined in consideration of a size of a hole cross section, a thickness of the side part of the mounting recessed part 120, and the like.

In addition, a cross sectional area of the hole cross section with a non-circular shape is preferably equal to or smaller than a cross sectional area of the hole cross section with a circular shape. In other words, the cross sectional area of the hole cross section preferably gradually decreases during a transition stage (the stage shown in FIG. 5B) in which the state of a circular shape as shown in FIG. 5A changes to a state of a non-circular shape as shown in FIG. 5C. Satisfying such a relationship enables a large amount of the cutting fluid to be supplied and, at the same time, enables discharge pressure to be increased in a vicinity of the leading end part due to an obtained throttle effect.

While the first fluid hole 130 and the second fluid hole 140 in the present embodiment are configured to even pass through the inside of the shank part 150, the hole cross section in the portions (the straight part 133 and the straight part 143) which pass through the inside of the shank part 150 need not have a circular shape. Note that the cross sectional area is preferably larger than the cross sectional area of the circular shape shown in FIG. 5A.

Figure 6:
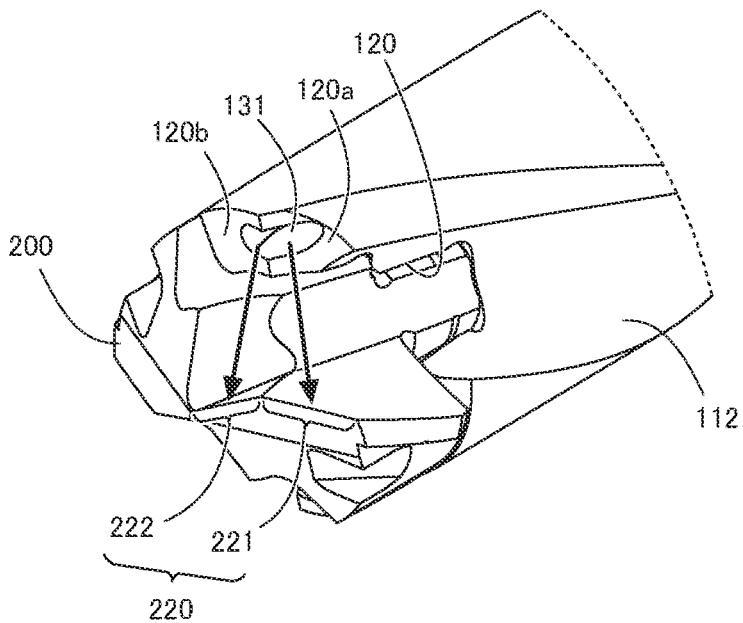
FIG. 6 is an enlarged perspective view in a vicinity of a leading end part.

FIG. 6 is an enlarged perspective view in a vicinity of the leading end part 112. More specifically, FIG. 6 is a diagram for explaining a flow of the cutting fluid which is discharged from the discharge port 131 of the first fluid hole 130 in a vicinity of the leading end part 112 in a state where the cutting edge member 200 has been mounted. The discharge port 131 is provided immediately after where the first fluid hole 130 is bent in a side part of the mounting recessed part 120 as described with reference to FIG. 3.

As illustrated, the discharge port 131 in the present embodiment is provided so as to straddle two end surfaces (a first end surface 120a and a second end surface 120b) of the mounting recessed part 120. The cutting fluid discharged from an opening portion, of the discharge port 131, which is positioned on the first end surface 120a mainly directly reaches a major cutting edge 221 of the cutting edge 220 of the cutting edge member 200. On the other hand, the cutting fluid discharged from an opening portion, of the discharge port 131, which is positioned on the second end surface 120*b* mainly directly reaches a thinning cutting edge 222 of the cutting edge 220 of the cutting edge member 200. In this manner, due to the first fluid hole 130 being bent in the leading end part 112, the cutting fluid can be directly supplied to the cutting edge 220.

In particular, in the present embodiment, since the opening portion positioned on the first end surface 120*a* is formed in a non-circular shape longer in a direction along a direction in which the major cutting edge 221 extends than in a direction perpendicular to the direction in which the major cutting edge 221 extends, the major cutting edge 221 can be effectively cooled even with a small amount of the cutting fluid. While the discharge port 131 is provided in the present embodiment so as to straddle the first end surface 120*a* and the second end surface 120*b* in accordance with the cutting edge 220 being provided so as to straddle the two regions of the major cutting edge 221 and the thinning cutting edge 222, a shape and an arrangement of the discharge port 131 may be determined in accordance with a configuration of the cutting edge 220. In such a case, a non-circular shape is favorably formed in which the direction parallel to the direction in which the cutting edge extends is longer than the direction perpendicular to the direction in which the cutting edge extends.

Although not represented in FIG. 6, the discharge port 141 of the second fluid hole 140 also has an opening shape similar to that of the discharge port 131, opposes a cutting edge 220 which differs from the cutting edge 220 opposed by the discharge port 131, and directly supplies the major cutting edge 221 and the thinning cutting edge 222 of the different cutting edge 220 with the cutting fluid. In other words, when the cutting edge member 200 is correctly mounted to the drill body 100, the discharge port 131 and the discharge port 141 assume a relationship in which each discharge port opposes a different cutting edge 220. Therefore, a worker can correctly fix the cutting edge member 200 to the drill body 100 by matching rotational phases and fitting the mounting projected part 210 into the mounting recessed part 120 while checking relative positions of the discharge ports 131 and 141 and the cutting edges 220. In other words, the fact that the flow hole is bent in the leading end part and an orientation of the discharge ports is adjusted contributes toward mounting the cutting edge member 200 to the drill body 100 as prescribed.

Figure 7:
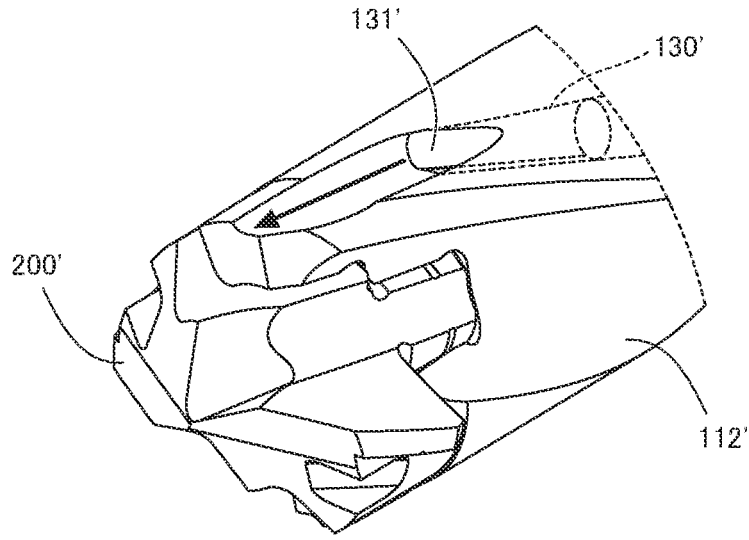
FIG. 7 is an enlarged perspective view of a leading end part according to another embodiment.

On the other hand, depending on a configuration of the cutting edge member 200, a material of the work, or the like, there may be cases where it is better to direct the cutting fluid toward the work as compared to having the cutting fluid directly strike the cutting edge 220. Another embodiment which accommodates such cases will now be described. FIG. 7 is an enlarged perspective view of a leading end part 112' according to the other embodiment. Since the other embodiment has a similar configuration to the drill 10 unless otherwise noted, a description will be omitted.

A cutting edge structure of a cutting edge member 200' to be mounted differs from a cutting edge structure of the cutting edge member 200 described above and, as illustrated, a first fluid hole 130' is provided such that a discharge port 131' is directed toward the work without bending in a leading end part 112'. However, in the body part 110, the structure in which the hole cross sections change from a circular shape to a non-circular shape which is longer in the circumferential direction than the radial direction in an axial cross section of the body part 110 midway along a path from the base end part 111 toward the leading end part 112 and assume a non-circular shape in a portion which passes a side part of the mounting recessed part 120 is similar to that of the drill body 100. A second fluid hole not represented in the drawing also has a similar configuration. Therefore, the cutting fluid discharged from each discharge port arrives as though striking a surface of the work. Even with the drill body 100 including such discharge ports, a large hole cross section can be realized while securing stiffness of a side portion of the mounting recessed part.

Figure 8:
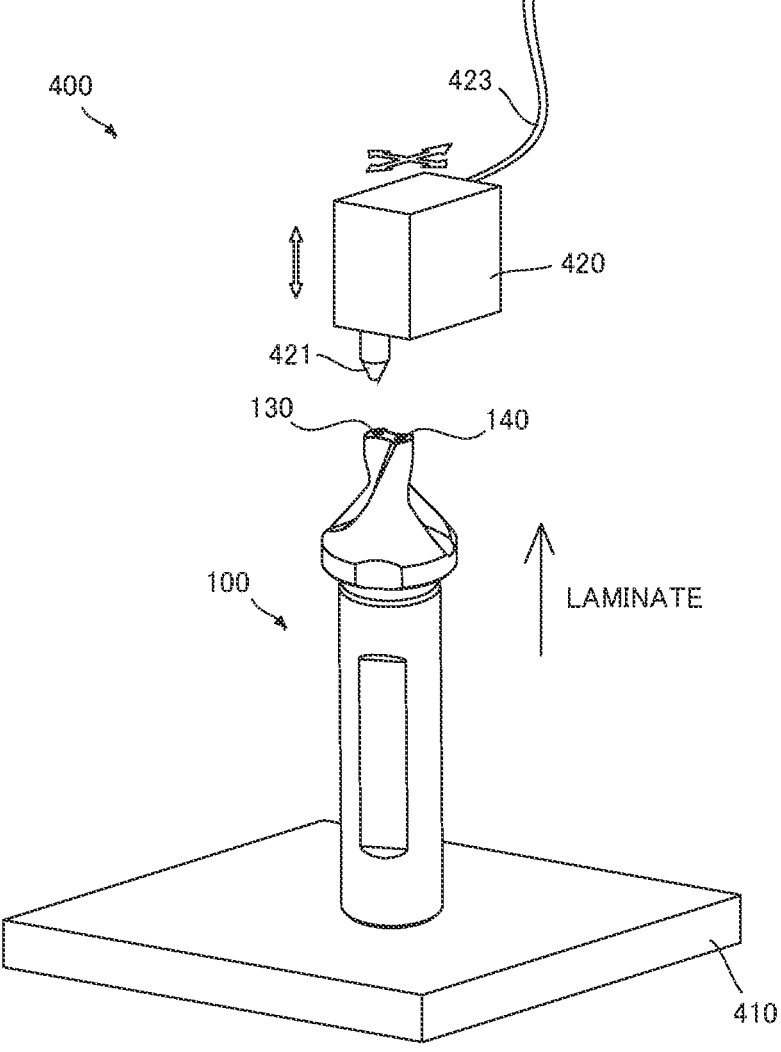
FIG. 8 is a diagram schematically showing a drill body being manufactured using a 3D printer.

Next, an example of a manufacturing method of the drill body 100 will be described. When forming the drill body 100 with steel, not cemented carbide, a 3D printer can be used. FIG. 8 is a diagram schematically showing the drill body 100 being manufactured using a 3D printer. While several systems of 3D printers which handle metallic materials are known, an FDM system will now be described.

A 3D printer 400 includes a stage 410 and a head 420 (both illustrated), controls the head 420 using a control unit (not illustrated), and forms the drill body 100 on the stage 410. As indicated by a white arrow, the head 420 is movable in a planer direction and a height direction with respect to the stage 410. The head 420 includes a nozzle 421 pointed in a direction of the stage 410. As a laminated material, a thermoplastic resin material containing steel powder is used. The laminated material supplied to the head 420 is heated and melted and discharged from the nozzle 421. A discharge position and a discharge amount of the laminated material which is discharged from the nozzle 421 are controlled by the control unit.

The 3D printer 400 discharges and solidifies a discharge material by an amount corresponding to a predetermined height in an upward direction from on top of the surface of the stage 410 and repetitively performs this procedure to laminate the discharge material to form the drill body 100. Subsequently, the resin material is removed by degreasing, and after performing a sintering process, the drill body 100 is completed.

Adopting such a manufacturing method enables the first fluid hole 130 and the second fluid hole 140 as described above to be comparatively readily formed inside the drill body 100. While a case where the drill body 100 includes two fluid holes, namely, the first fluid hole 130 and the second fluid hole 140 has been described in the present embodiment, the number of fluid holes is not limited thereto. There may be one fluid hole or three or more fluid holes. In particular, when three or more discharge grooves 113 are provided, the fluid holes may be provided in a same number as the discharge grooves 113.

In addition, while a case where the discharge groove 113 has a spiral shape has been explained in the present embodiment described above, for example, the drill body 100 may include a linear discharge groove.

What is claimed is:

1. A drill body, comprising:
   a body part which extends in a rod shape from a base end part toward a leading end part;
   a discharge groove which is provided around a central axis of the body part in order to discharge chips;
   a fluid hole which is provided such that at least a part thereof passes through an inside, of the body part, of an inter-groove solid part of the discharge groove and which causes a fluid to flow from a side of the base end part toward a side of the leading end part; and
   a mounting part which is provided in the leading end part and which is for mounting a removable cutting edge member, wherein the mounting part has a recessed part which is provided along the central axis of the body part from an end surface of the leading end part, a hole cross section of the fluid hole orthogonal to a flow path direction thereof changes from a circular shape midway along a path of the fluid hole from the base end part toward the leading end part to a first non-circular shape which is longer in a circumferential direction than in a radial direction in an axial cross section of the body part closer to the leading end part, and is a second non-circular shape in a portion which passes a side of the recessed part, and the first non-circular shape and second non-circular shape are the same as each other or are different from each other.

2. The drill body according to claim 1, wherein a cross sectional area of the hole cross section which has the first non-circular shape is equal to or smaller than a cross sectional area of the hole cross section which has the circular shape.

3. The drill body according to claim 1, wherein a discharge port in the leading end part of the fluid hole is provided directed toward a cutting edge of the cutting edge member mounted to the mounting part.

4. The drill body according to claim 3, wherein the discharge port is provided with the fluid hole being bent.

5. The drill body according to claim 4, wherein an opening portion of the discharge port, which discharges the fluid to a major cutting edge that forms the cutting edge, is a non-circular shape longer in a first direction along the major cutting edge than in a second direction that is perpendicular to the first direction.

6. The drill body according to claim 1, wherein the body part is formed of a steel material.

* * * * *